United States Patent [19]

Knesek et al.

[11] Patent Number: 5,785,749
[45] Date of Patent: Jul. 28, 1998

[54] METHOD FOR PRODUCING RHEOLOGICAL ADDITIVES AND COATING COMPOSITIONS INCORPORATING SAME

[75] Inventors: Benjamin W. Knesek; Terrence P. Brennan; Carl J. Bauer, all of Gonzales, Tex.

[73] Assignee: Southern Clay Products, Inc., Gonzales, Tex.

[21] Appl. No.: 802,269

[22] Filed: Feb. 19, 1997

[51] Int. Cl.$^6$ ................................................ C09C 1/42
[52] U.S. Cl. ...................... 106/484; 106/486; 241/16; 241/21; 241/22; 241/26; 241/30
[58] Field of Search ............................ 106/484, 486, 106/416; 501/149; 241/15, 16, 21, 22, 26, 30; 162/181.8

[56] References Cited

U.S. PATENT DOCUMENTS

| | | |
|---|---|---|
| 3,075,710 | 1/1963 | Feld ................................... 241/16 |
| 3,097,081 | 7/1963 | Eastman et al. . |
| 3,097,801 | 7/1963 | Duke .................................. 106/484 |
| 3,326,705 | 6/1967 | Duke .................................. 106/486 |
| 3,398,008 | 8/1968 | Jacobs et al. ........................ 106/484 |
| 3,476,576 | 11/1969 | Sennett et al. . |
| 3,639,162 | 2/1972 | Bixler . |
| 3,743,190 | 7/1973 | Whitley ............................... 241/4 |
| 3,754,712 | 8/1973 | Cecil ................................... 241/4 |
| 3,798,044 | 3/1974 | Whitley ............................... 106/484 |
| 4,118,245 | 10/1978 | Hamill et al. ........................ 106/484 |
| 4,118,246 | 10/1978 | Horzepa et al. ..................... 501/148 |
| 4,241,142 | 12/1980 | Kaliski et al. . |
| 4,593,860 | 6/1986 | Cook et al. . |
| 4,693,427 | 9/1987 | Bilimoria et al. . |
| 4,845,191 | 7/1989 | Hautler . |
| 4,868,228 | 9/1989 | Gonnet et al. . |
| 4,929,580 | 5/1990 | Jones ................................... 501/149 |
| 4,943,324 | 7/1990 | Bundy et al. . |
| 5,261,956 | 11/1993 | Dunaway et al. . |
| 5,393,340 | 2/1995 | Slepetys et al. ..................... 106/484 |
| 5,624,488 | 4/1997 | Forbus et al. ....................... 106/486 |

FOREIGN PATENT DOCUMENTS 1120219  7/1968  United Kingdom .

*Primary Examiner*—Michael Marcheschi
*Attorney, Agent, or Firm*—Klauber & Jackson

[57] ABSTRACT

An improved process for preparing an aqueous clay slurry having superior gellation properties. The process involves the bead milling of the clay in an aqueous medium for a period of about 0.5 to 20 minutes at an energy input level of about 44 to 146 kilowatt-hours per metric ton of dry clay. The milling may carried out using any suitable horizontal or vertical sand mill or ball mill such as the "Morehouse Cowles Sandmill" or the "Polymill" containing a grinding medium such as zirconium silicate or zirconium oxide. The clay is preferably a smectite clay such as montmorillonite and is present in the slurry in the range of about 3 to 30 wt. %, based on the total weight of the slurry. The aqueous clay slurry is useful as a rheological additive in water-based coating formulations.

15 Claims, 3 Drawing Sheets

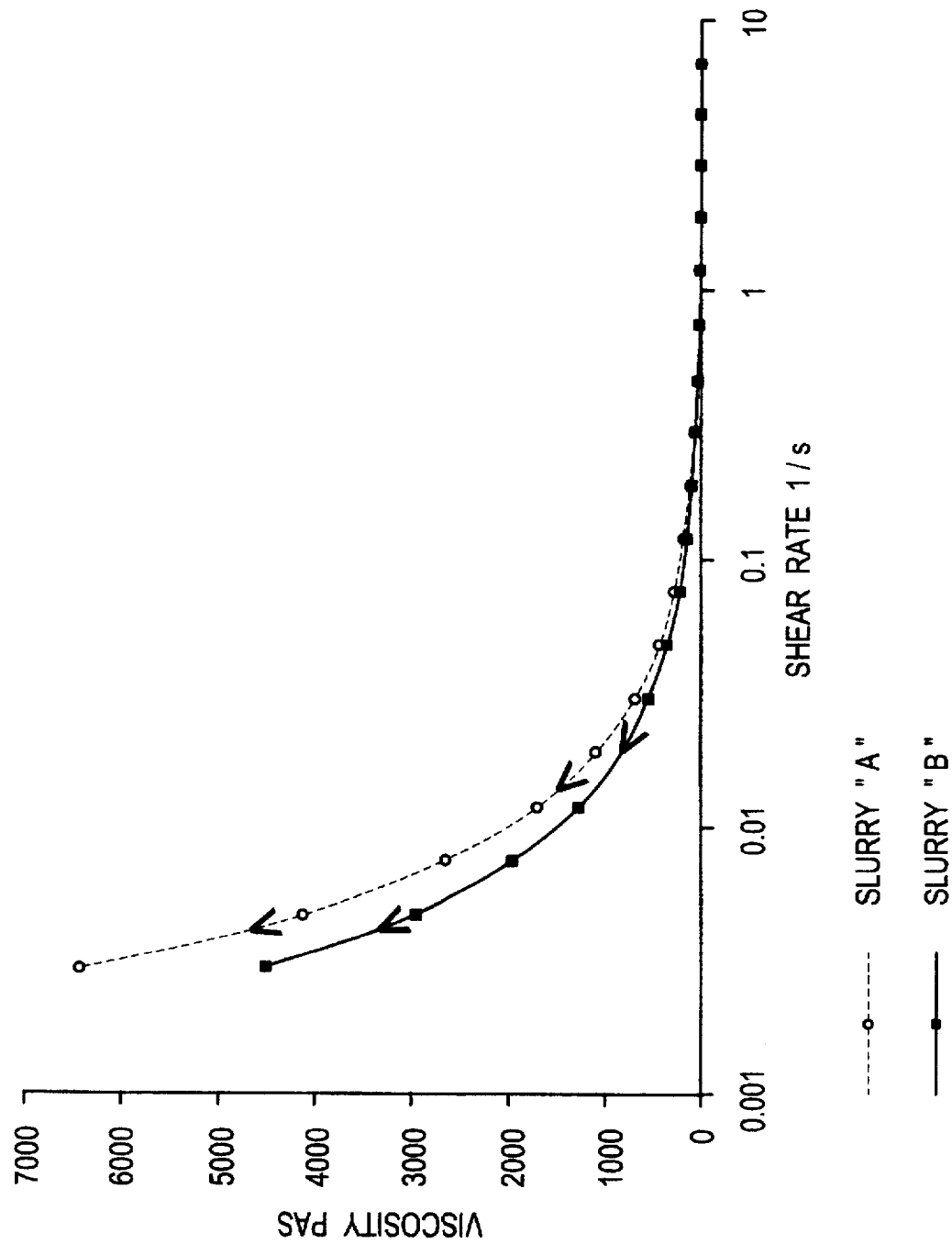

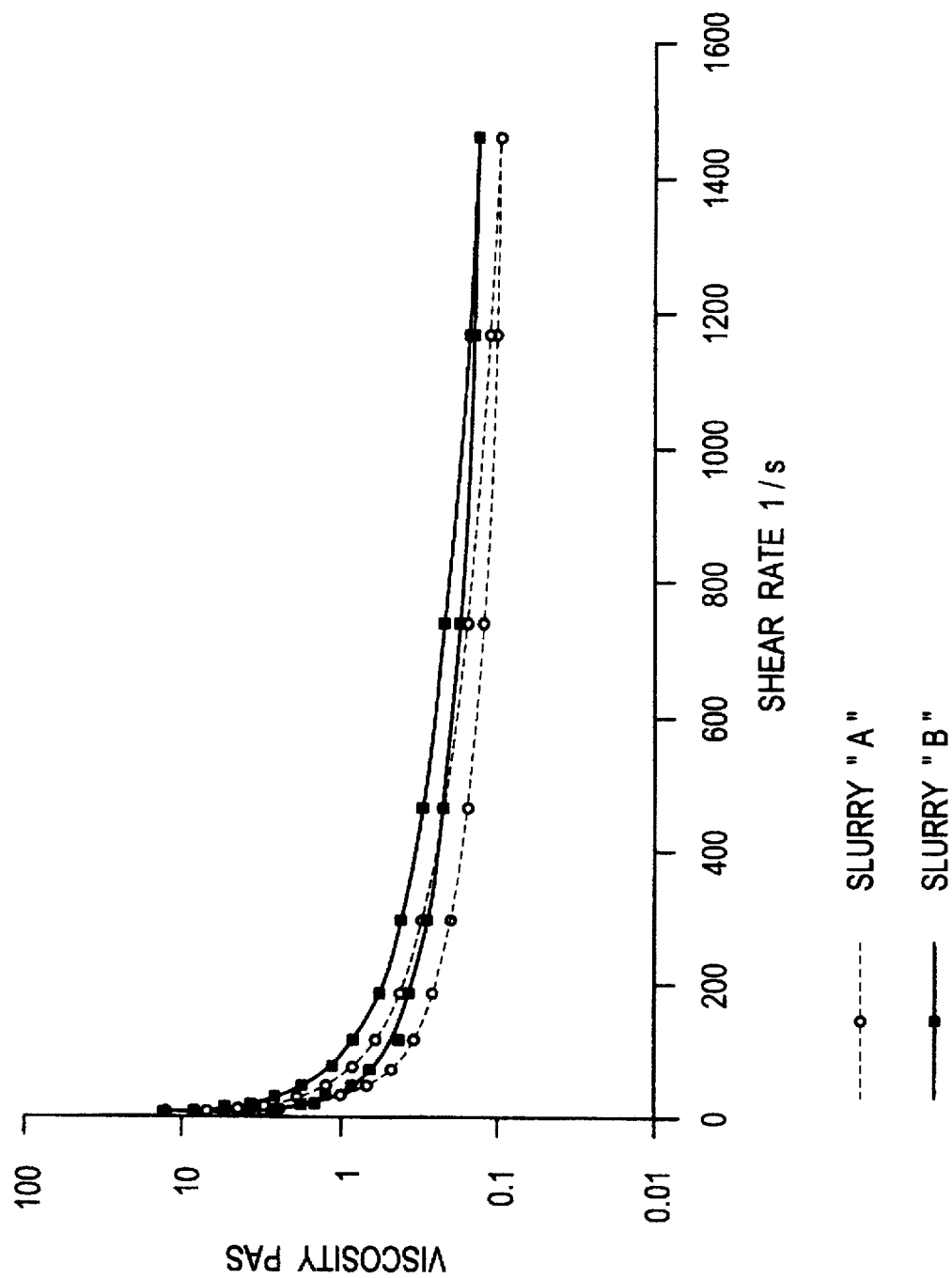

METHOD FOR PRODUCING RHEOLOGICAL ADDITIVES AND COATING COMPOSITIONS INCORPORATING SAME

FIELD OF INVENTION

The invention relates generally to a process for producing rheological additives, e.g. aqueous clay slurries, and to water-based coating compositions containing such additives.

BACKGROUND OF INVENTION

Processes for wet milling clays so as to result in aqueous clay slurries are well known in the prior art. Such prior art is exemplified by U.S. Pat. Nos. 3,097,801; 3,754,712; 4,118,245; 4,118,246; and U.K. patent 1,120,219.

The resultant aqueous clay slurries have been found to be useful as rheological additives for water-based coating formulations, e.g. latex paints. These water-based coating formulations generally require the addition of other thickeners such as hydroxyethyl cellulose ("HEC") alone or in combination with an alkali-swellable thickener such as "HASE".

The coating industry has been seeking rheological additives such as aqueous clay slurries which would allow the preparation of water-based coating formulations which perform satisfactorily with reduced levels of such other thickeners. In particular, there is a need, from a cost and performance point of view, for satisfactory water-based coatings containing little or no HEC.

The aqueous clay slurries prepared in accordance with the process of the invention meet the needs of the coating industry. In particular, the aqueous clay slurries prepared in accordance with the invention offer the following unique performance parameters:

1. The instant aqueous clay slurries possess a rheology curve having lesser of a slope than that associated with prior art aqueous clay slurries. This difference in slope is demonstrated by the fact that latex paints containing the instant aqueous clay slurries exhibit a lower Brookfield viscosity value (measured at 20° C. and 1 rpm) than aqueous clay slurries prepared in accordance with prior art processes. Such lower Brookfield viscosity values translate into paints possessing less of a gelled consistency.

2. Aqueous clay slurries prepared by the process of the invention have lower thixotropic indices and also exhibit delayed recovery of viscosity in comparison to aqueous clay slurries prepared by prior art processes. These properties translate into easier handling, i.e. easier to pump and pour, at higher solids levels.

3. Aqueous clay slurries prepared by the process of the invention are considerably more cost effective than those prepared by the expensive prior art milling processes.

4. Aqueous clay slurries prepared in accordance with the invention permit the formulation of water-based coatings containing much lower levels of HEC and/or HASE than water-based coatings formulated with aqueous clay slurries prepared in accordance with the prior art.

5. Paints formulated with the aqueous clay slurries prepared in accordance with the invention exhibit enhanced flow and leveling characteristics than paints formulated with aqueous clay slurries prepared in accordance with prior art processes. The enhanced flow and leveling characteristics were documented by carrying out hysteresis loops on the paints and showing that a significant lag in viscosity recovery occurred with the paint containing the aqueous clay slurries prepared in accordance with the invention. Further evidence of enhanced flow and leveling was developed by comparative Laneta Flow and Leveling tests utilizing paints containing the aqueous clay slurries prepared in accordance with the invention.

6. Paints formulated with the aqueous clay slurries of the invention exhibit enhanced hiding characteristics at a lower clay loading level than prior art aqueous clay slurries.

DETAILS OF INVENTION

The invention comprises an improved process for preparing aqueous clay slurries, as well as the slurries produced by such slurry and water-based coatings containing such slurries. The improvement comprises bead milling the clay in an aqueous medium for a period of time in the range of about 0.5 to 20 minutes, preferably 1.5 to 9 minutes, at an energy input in the range of about 44 to 146, preferably 59 to 73, kilowatt-hours/metric ton of dry clay.

The term "bead milling" is synonymous with the term "stirred ball milling" and is intended to encompass a process whereby the clay particles, present as an aqueous slurry, undergo random disintegration by the use of a retained grinding medium. Grinding in the case of bead mills occurs primarily by compression or collision and, to a minor extent, by shear. In contra-distinction thereto, dispersion mills cause a disintegration of the particles principally by high shear.

Any bead mill which is commercially available and is typically used for grinding of pigments and clay materials is suitable for practicing the process of the present invention. Particularly good results have been achieved by bead milling aqueous clay slurries with the "Morehouse Cowles Sandmill" or similar vertical sand mill and the "Polymill" available from J. H. Day Co. of Cincinnati, Ohio. However, horizontal sand mills as well as ball and pebble mills are also suitable for practicing the process of the invention.

The grinding medium for use in the bead mill may have a diameter in the range of about 0.4 to 50 mm, preferably in the range of 1 to 15 mm; especially preferred is a grinding medium having a diameter of about 10 mm. The grinding media may be spherical (which is preferred), ovoid or elliptical and may be comprised of materials such as ceramics, silica, sand or steel. Suitable grinding media comprise Ottawa sand, unleaded hard glass, leaded hard glass, aluminum oxide, zirconium silicate, zirconium oxide and steel shot; the preferred grinding media are zirconium silicate and zirconium oxide.

Preferably, the clay employed for preparing the aqueous clay slurry is a smectite clay such as montmorillonite, bentonite, hectorite, saponite or nontronite. The preferred smectite clay is montmorillonite, especially sodium montmorillonite and calcium montmorillonite. Particularly preferred are sodium converted calcium montmorillonite and blends thereof with calcium montmorillonite.

In general, the aqueous medium will consist of water, although other water-soluble media such as glycols may also be present. Typically, the clay:aqueous medium ratio is such that the clay will be present in the aqueous slurry in an amount in the range of about 3 to 30 wt. %, preferably 6 to 20 wt. %, based on the weight of the aqueous slurry.

The aqueous clay slurry prepared by the process of the invention is useful for incorporation, as a rheological additive, in water-based coating formulations such as latex paints. The aqueous clay slurry is utilized in the water-based coating formulation in an amount in the range of about 6 to 120 g per liter of formulation.

DESCRIPTION OF THE DRAWINGS

FIGS. 1, 1A and 1B represent plots of the hysteresis loops under a full strain scan, low shear recovery phase and high shear scan, respectively, in respect to Slurry "A" and Slurry "B" which are identified below.

FIGS. 1, 1A and 1B illustrate the advantages of the aqueous clay slurry prepared in accordance with the process of the invention (i.e. Slurry "B"), over an aqueous clay slurry prepared in accordance with prior art processes (Slurry "A").

Figure 1:
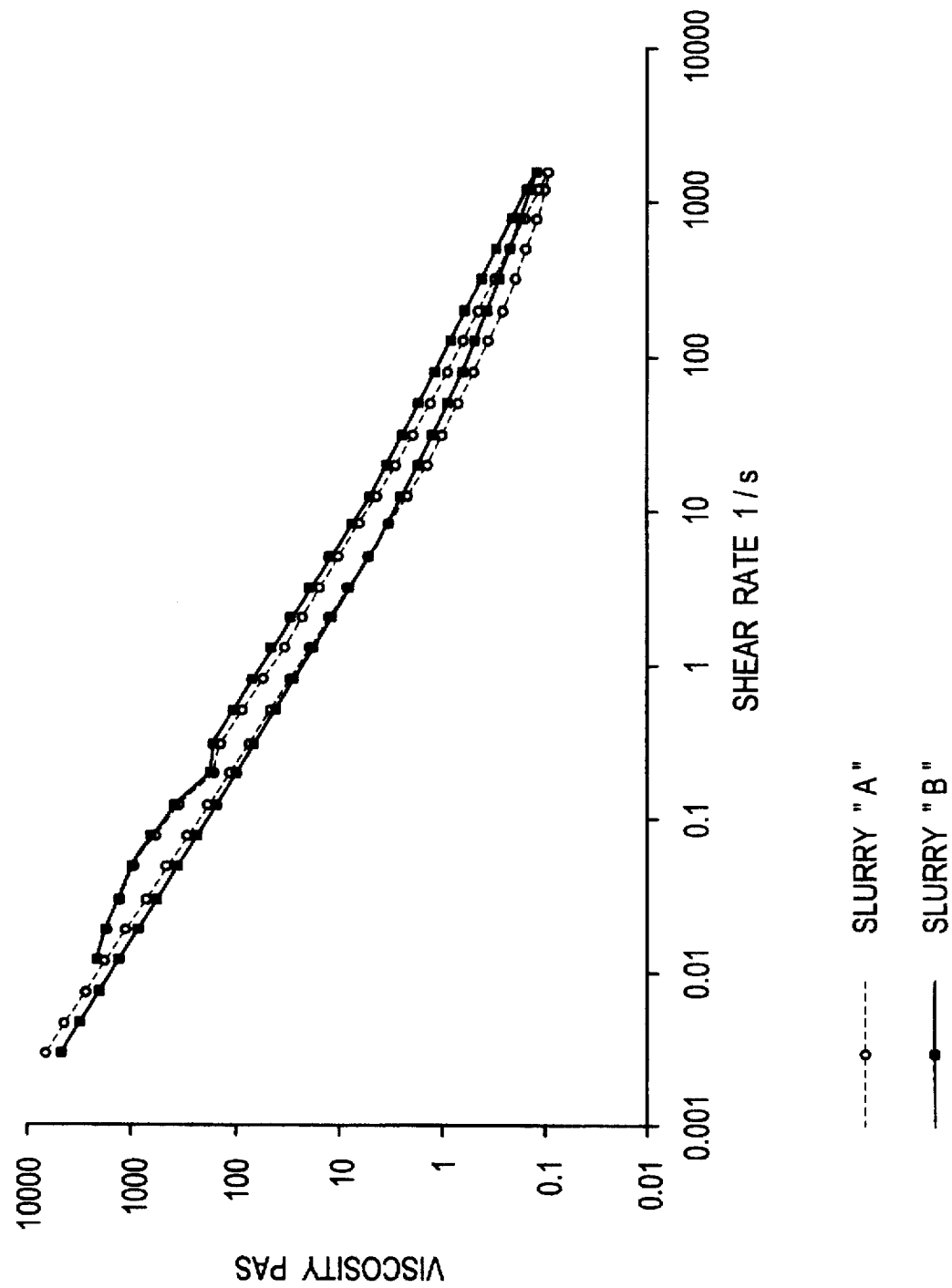

As mentioned above, the aqueous slurry of the invention exhibits improved handling characteristics at higher solids levels which manifests itself in the form of greater ease of pouring. This advantage is shown in the Figures as well as the Slurry Characterization Table below by virtue of the lower Brookfield 1 rpm viscosity values for Slurry "B" as well as by virtue of the lower thixotropic indices for Slurry "B".

Referring to FIGS. 1 and 1B, inspection of the left side of the Figures indicates viscosity recovery after shear is applied. It is seen that Slurry "B" recovers more slowly, thus maintaining the viscosity at a lower value as the material is subjected to lower shear after mixing. The far right side of FIGS. 1 and 1A indicates higher viscosity at high shear. This combination of lower viscosity at low shear and higher viscosity at high shear results in a flatter rheology curve (i.e. lesser slope) which in turn indicates that Slurry "B" will act more like a thickener rather than as a thixotrope. That is, Slurry "B" will pour at higher solids level and it will tend to pour, not "plop", when it is dumped, thus indicating easier handling.

FIG. 1 is a full strain hysteresis loop of Slurry "A" and Slurry "B", i.e. a measurement of the viscosities of the two slurries under different shear rates. The points of interest are as follows:

Initially as one proceeds in the hysterisis loop, the viscosities of the two slurries essentially mirror each other.

At the downward dip in the loop, Slurry "B" begins to separate from Slurry "A" at this dip as increasing shear is applied. Slurry "B" exhibits a significantly higher viscosity than Slurry "A" at the highest shear rate (i.e. at the shear rate of 1460/sec., the viscosity of Slurry "A" was 0.0945 Pas and the viscosity of Slurry "B" was 0.130 Pas. See FIG. 1B for a detailed view of this portion of the curve on a linear X axis.

At the middle of the return part of the loop, evidence of the delay in the viscosity recovery of Slurry "B" is apparent since the viscosity of Slurry "B" is once again equal to that of Slurry "A" as shear is relieved.

At the end of the loop the lag in viscosity recovery for Slurry "B" is quite pronounced. The viscosity of Slurry "B" at this point is 4550 Pas and the viscosity for Slurry "A" is 6430 Pas. FIG. 1A presents a detailed view of this portion of the curve on a linear Y axis.

Slurry "A" was prepared in the following manner:
1. Weigh out 3.52 kg water.
2. Agitate the water with a 40 mm "Cowles"-type blade at 1,000 rpm on a "Dispermat" mill.
3. Weigh out 480 g "Bentolite WH" ("Bentolite WH" is a sodium converted calcium montmorillonite).
4. Add the "Bentolite WH" to the water while continuing the agitation as per step 2.
5. Increase the rate of agitation to 5,000 rpm and continue to mix for 15 minutes.

Slurry "B" was prepared in the following manner:
1. Measure 1178 l water.
2. Agitate the water with a 400 mm "Cowles"-type blade in a "Cowles" mixer at 800 rpm.
3. Add 159 kg "Bentolite WH" to the water while continuing the agitation as per step 2.
4. Continue to mix to 15 minutes.
5. Pump the mixture through a 133 liter capacity "Morehouse Cowles Sandmill" operating as follows:
   Energy Input: 37 kw
   Media Capacity: 95 kg
   Media Description: 1 cm silica beads
   Amperage Under Load: 42.3 amps
   Flow Rate: 49 liters/minute

| Slurry Characterization Table | | |
|---|---|---|
| Rheology Measurements | Slurry "A" | Slurry "B" |
| Brookfield viscosities immediately after processing: | | |
| 1 rpm (#6 spindle) | 78,200 | 70,200 |
| 10 rpm (#6 spindle) | 9,400 | 10,360 |
| 100 rpm (#6 spindle) | 1,170 | 1,696 |
| Thixotropic indices immediately after processing: | | |
| 1:10 | 8.32 | 6.77 |
| 1:100 | 66.84 | 41.39 |
| 10:100 | 8.03 | 6.11 |
| Brookfield viscosities 1 hour after processing: | | |
| 1 rpm (#6 spindle) | 97,800 | 91,400 |
| 10 rpm (#6 spindle) | 10,540 | 11,840 |
| 100 rpm (#6 spindle) | 1,318 | 1,836 |
| Thixotropic indices 1 hour after processing: | | |
| 1:10 | 9.28 | 7.72 |
| 1:100 | 74.20 | 49.78 |
| 10:100 | 8.00 | 6.45 |
| Brookfield viscosities 72 hours after processing: | | |
| 1 rpm (#6 spindle) | 267,000 | 210,000 |
| 10 rpm (#6 spindle) | 25,100 | 26,500 |
| 100 rpm (#6 spindle) | 3,170 | 3,640 |
| Thixotropic indices 72 hours after processing: | | |
| 1:10 | 10.64 | 7.92 |
| 1:100 | 84.23 | 57.69 |
| 10:100 | 7.92 | 7.28 |

The following nonlimiting examples shall serve to illustrate the invention. Unless otherwise indicated, all parts and percentages are on a weight basis.

In respect to the performance characteristics set forth below, the following terms have the indicated meanings:

1. Flow and leveling: These characteristics refer to the ability of an applied coating film to flow out and not show defects such as brush marks. Higher flow and leveling ratings translate into better flow characteristics. Typically, water-based coating formulations do not match solvent-based coating formulations in this regard.

2. Gelled: Paint formulators frequently manufacture paints having a gelled or livery appearance. Such appearance is undesirable since the paint does not have the appearance of a smooth, creamy material in the paint can. Typically, this characteristic is associated with high 1 rpm Brookfield viscosity values and high 1:KU thixotropic indices.

3. Hiding/Contrast Ratio: Hiding is the ability of a coating film to provide color sufficient to mask any color of the underlying substrate. This is typically expressed as a measure of the contrast ration. Contrast ratio measures the lightness of the film over a white substrate and that over a black substrate. The lightness value for the black substrate is divided by the lightness value for the white substrate and multiplied by 100. The higher the number, the closer the colors over black and white, and the better the ability of the film to hide.

EXAMPLE 1

Three paints were prepared with the components indicated below. Paint K was formulated using Slurry "A" prepared in accordance with the prior art as indicated above; Paint L was formulated using "Slurry B" prepared in accordance with the process of the invention as indicated above; Paint M is the standard prior art paint formulation against which Paint K and Paint L were compared. All amounts set forth below are expressed in kilograms.

| Component | Paint K | Paint L | Paint M |
|---|---|---|---|
| Water | 101.96 | 116.90 | 131.93 |
| NATROSOL 250 MHBR | 0.35 | 0.35 | 2.47 |
| Mix 10 minutes, then add: | | | |
| Slurry "A" | 36.59 | — | — |
| Slurry "B" | — | 21.17 | — |

Mix 5 minutes, then add while agitating:

| | | | |
|---|---|---|---|
| TROYSAN 142 | 0.44 | 0.44 | 0.44 |
| "AMP-95"[3] | 0.44 | 0.44 | 0.44 |
| BUBBLE BREAKER 748 | 0.44 | 0.44 | 0.44 |
| TRITON CF-10 | 1.32 | 1.33 | 1.34 |
| TAMOL 731 | 2.65 | 2.67 | 2.69 |
| Propylene Glycol | 8.83 | 8.91 | 9.06 |

Mix, then add while agitating:

| | | | |
|---|---|---|---|
| "CR-800"[7] | 35.27 | 35.60 | 35.81 |
| ECCA TEX 90 | 18.52 | 18.69 | 18.80 |
| SNOWFLAKE WHITE | 203.26 | 205.08 | 206.30 |

Disperse for 20 minutes at 5,000 rpm, then add while mixing at low speed:

| | | | |
|---|---|---|---|
| Water | 44.09 | 44.50 | 44.75 |
| "HCAR 379"[10] | 95.07 | 95.93 | 96.49 |
| TEXANOL | 3.53 | 3.56 | 3.58 |
| BUBBLE BREAKER 748 | 0.88 | 0.89 | 0.90 |

Identification of Components

NATROSOL 250 MHBR Hydroxyethylcellulose additive from Aqualon Corp.

TROYSAN 142 Bactericide from Troy Chemicals Corp.

"AMP-95"[3]: Pigment wetting agent/pH adjuster from Angus Chemical Corp.

BUBBLE BREAKER 748: Defoamer from Witco Chemical Co.

TRITON CF-10: Dispersant from Rohm & Haas Corp.

TAMOL 731: Wetting agent from Rohm & Haas Corp.

"CR-800"[7]: Titanium dioxide from Kerr-McGee Corp.

ECCA TEX 90: Kaolin from English China Clay Corp.

SNOWFLAKE WHITE: Calcium Carbonate from English China Clay Corp.

"UCAR 379"[10]: Vinyl acrylic emulsion from Union Carbide Corp.

TEXANOL: A high molecular weight alcohol

The performance of Paints K, L and M is set forth in the table below:

| | Paint K | Paint L | Paint M |
|---|---|---|---|
| Rheological Package | Dry Smectite plus HEC | Bead Milled Smectite plus HEC | HEC |
| Quantity/378 1 Paint | | | |
| Smectite, dry kg | 4.36 | 2.50 | 0.00 |
| HEC, kg | 0.35 | 0.35 | 2.47 |
| Stormer Viscosity, KU | 96 | 95 | 95 |
| Brookfield Viscosities, 24 hours (cps) | | | |
| 1 rpm (#6 spindle) | 39,000 | 32,000 | 33,000 |
| 10 rpm (#6 spindle) | 9,100 | 8,000 | 8,000 |
| 100 rpm (#6 spindle) | 2,300 | 2,140 | 2,120 |
| Thixotropic Indices | | | |
| 1:10 | 4.29 | 4.00 | 4.12 |
| 1:100 | 16.95 | 14.95 | 15.56 |
| 10:100 | 3.96 | 3.74 | 3.77 |
| 1:KU | 406.25 | 336.84 | 347.37 |
| ICI (poise) | 1.00 | 0.95 | 0.80 |
| Sag Resistance (mils) | 8 | 7 | 6 |
| Flow and Leveling (0-Poor; 10-Excellent) | 2 | 4 | 2 |
| Hiding Characteristics | | | |
| $Y_{LIGHT}$ | 89.08 | 88.92 | 88.40 |
| $Y_{BLACK}$ | 84.99 | 84.94 | 81.29 |
| Contrast Ratio | 95.40 | 95.52 | 91.96 |

Discussion of Example 1

In Example 1, a conventionally-thickened Paint M containing HEC was compared to Paint K—a paint containing a conventionally processed aqueous slurry of smectite clay and Paint L—a paint containing an aqueous slurry of smectite clay prepared in accordance with the process of the invention. The rheology numbers presented as Brookfield viscosities and Stormer viscosities for Paint M are target numbers. In the case of Paint K, the Brookfield viscosities in all categories exceed those of Paint M and the Stormer viscosity matches that of Paint M. This manifests itself as a paint having a gelled appearance—a trait found to be objectionable by many paint companies.

On the other hand, Paint L prepared with the aqueous smectite clay slurry in accordance with the invention is a virtual match in both Brookfield and Stormer viscosities with that of Paint M, but does not have the HEC content of Paint M. Paint L is quite fluid without any gelled appearance. It should also be noted that Paint L has even lower thixotropic indices than Paint M which manifests itself as a smoother, more pourable product at equal viscosities which in turn results in improved flow and leveling. Moreover, Paint L exhibits a significantly higher ICI viscosity which translates into improved roller spatter resistance.

Further evidence of the superiority of the paint formulations prepared with the aqueous clay slurries of the invention is manifested by the contrast ratios. It is significant to note that Paint L exhibits an improvement in contrast ratio over that of Paint K notwithstanding that Paint L contained only 58% of the clay employed in Paint K.

Example 2

Three paints were prepared with the components indicated below. Paint S was formulated using Slurry "A"; paint T was formulated using "Slurry B"; paint R is the standard prior art paint formulation against which Paint S and Paint T were compared. All amounts set forth below are expressed in kilograms.

| Component | Paint R | Paint S | Paint T |
|---|---|---|---|
| Water | 109.86 | 79.92 | 93.44 |
| NATROSOL 330 Plus | 1.00 | — | — |
| Slurry "A" | — | 34.02 | — |
| Slurry "B" | — | — | 18.14 |

Mix and add:

| | Paint R | Paint S | Paint T |
|---|---|---|---|
| Potassium Tripolyphosphate | 0.35 | 0.35 | 0.35 |
| "AMP-95" | 0.88 | 0.88 | 0.88 |
| BUBBLE BREAKER 748 | 0.44 | 0.44 | 0.44 |

Mix and add:

| | Paint R | Paint S | Paint T |
|---|---|---|---|
| "CR-800" | 22.09 | 22.09 | 22.09 |
| ECCA TEX 90 | 39.77 | 39.77 | 39.77 |
| SNOWFLAKE WHITE | 132.48 | 132.48 | 132.48 |

Disperse for 20 minutes at 5,000 rpm; then add while mixing at low speed:

| | | | |
|---|---|---|---|
| RHOPLEX AC-264 | 154.66 | 154.66 | 154.66 |
| TEXANOL | 22.09 | 22.09 | 22.09 |
| TROYSAN 142 | 0.88 | 0.88 | 0.88 |
| Water | 44.19 | 44.19 | 44.19 |
| ACRYSOL RM-825 | 1.81 | — | — |
| ACRYSOL TT-935 | — | 4.08 | 4.08 |
| BUBBLE BREAKER 748 | 0.44 | 0.44 | 0.44 |

NATROSOL 330 Plus: Hydrophobically-modified hydroxy-ethylcellulose from Aqualon Corp.

RHOPLEX AC-264: Vinyl emulsion from Rohm & Haas Corp.

ACRYSOL RM-825: Urethane associative thickener from Rohm & Haas Corp. (also referred to herein as"HEUR")

ACRYSOL TT-935: Alkali-swellable thickener from Rohm & Haas Corp. (also referred to herein as"HASE")

The performance of Paints R, S and T is set forth in the table below:

| | Paint R | Paint S | Paint T |
|---|---|---|---|
| Rheological Package Quantity/378 1 Paint | HEC/HEUR | Dry Smectite/HASE | Bead Milled Smectite/HASE |
| Smectite, dry kg | 0.00 | 4.08 | 2.18 |
| HEC | 1.03 | 0.00 | 0.00 |
| HASE | 0.00 | 4.08 | 4.08 |
| HEUR | 1.81 | 0.00 | 0.00 |
| Stormer Viscosity (KU) | 100 | 100 | 100 |
| Brookfield Viscosities, 24 hours (cps) | | | |
| 1 rpm (#6 spindle) | 14,000 | 22,000 | 16,000 |
| 10 rpm (#6 spindle) | 5,680 | 6,140 | 5,760 |
| 100 rpm (#6 spindle) | 2,316 | 2,512 | 2,324 |
| Thixotropic Indices | | | |
| 1:10 | 2.46 | 3.58 | 2.78 |
| 1:100 | 6.04 | 8.76 | 6.88 |
| 10:100 | 2.45 | 2.44 | 2.48 |
| 1:KU | 140.00 | 220.00 | 156.86 |
| ICI(poise) | 0.80 | 0.95 | 1.20 |

Discussion of Example 2

Example 2 compare the performance of Paint R—a conventionally-thickened paint formulation containing hydrophobically-modified HEC/HEUR, with Paint S—a paint formulation containing a conventionally-processed smectite clay and HASE and Paint T—a paint formulation containing a bead milled smectite clay of the invention. It is noted that the Stormer viscosity values are again achieved by Paint T with far less smectite clay than that present in Paint S. Moreover, the desired match in characteristics with standard Paint R is much closer in the case of Paint T than Paint S. The lower Brookfield viscosity values and thixotropy indices means that a more liquid paint has been obtained. Here again, it is seen that there is a sharp increase in ICI viscosity which translates into improved roller spatter resistance for Paint T.

What is claimed is:

1. A process for preparing a water-based coating formulation exhibiting improved pourability, improved hiding characteristics, and improved thickening in relation to the quantities of rheological additive in the coating formulation, comprising the steps of:

preparing an aqueous smectite clay slurry having 3 to 30% clay by weight;

bead milling the aqueous smectite slurry with a grinding media at an energy input in the range of from about 44 to 146 kw-hr/metric ton of dry clay; and incorporating the milled smectite slurry as a rheological additive in a water-based coating formulation in an amount in the range of from about 6 to 120 g per liter of formulation.

2. The process of claim 1 wherein the slurry is milled for 1.5 to 4 minutes.

3. The process of claim 1 wherein the energy input is in the range of 59 to 73 kilowatt-hours/metric ton of dry clay.

4. The process of claim 1 wherein the bead milling is carried out using a sand mill.

5. The process of claim 1 wherein the bead milling is carried out using a ball mill.

6. The process of claim 1 wherein the grinding media employed in the bead milling has a diameter in the range of about 0.4 to 50 mm.

7. The process of claim 6 wherein the grinding media employed in the bead milling has a diameter in the range of 1 to 15 mm.

8. The process of claim 1 wherein the grinding media employed in the bead milling is selected from the group consisting of Ottawa sand, unleaded hard glass, leaded hard glass, aluminum oxide, zirconium silicate, zirconium oxide and steel shot.

9. The process of claim 8 wherein the grinding medium employed in the bead milling comprises zirconium silicate.

10. The process of claim 8 wherein the grinding medium employed in the bead milling comprises zirconium oxide.

11. The process of claim 1 wherein the smectite clay comprises montmorillonite.

12. The process of claim 11 wherein the montmorillonite is selected from the group consisting of sodium montmorillonite, calcium montmorillonite, and blends of sodium montmorillonite with calcium montmorillonite.

13. A water-based coating formulation prepared by the process of claim 1.

14. A process for preparing a rheological additive for water-based coating compositions, which additive exhibits both low viscosity at low shear and a low thixotropic index, thereby possessing ease of pouring and pumping; said process comprising:

preparing an aqueous smectite clay slurry having 3 to 30% clay by weight; and ball milling the said slurry with a grinding media for 0.5 to 20 minutes at an energy input in the range of from about 44 to 146 kw-hr/metric ton of dry clay.

15. A rheological additive prepared by the process of claim 14.

* * * * *